US006770369B1

(12) United States Patent
Oyamada et al.

(10) Patent No.: US 6,770,369 B1
(45) Date of Patent: Aug. 3, 2004

(54) CONDUCTIVE ELECTROLESSLY PLATED POWDER, ITS PRODUCING METHOD, AND CONDUCTIVE MATERIAL CONTAINING THE PLATED POWDER

(75) Inventors: Masaaki Oyamada, Tokyo (JP); Shinji Abe, Tokyo (JP)

(73) Assignee: Nippon Chemical Industrial Co., Ltd., Tokyo (JP)

( * ) Notice: Subject to any disclaimer, the term of this patent is extended or adjusted under 35 U.S.C. 154(b) by 0 days.

(21) Appl. No.: 09/926,060

(22) PCT Filed: Feb. 21, 2000

(86) PCT No.: PCT/JP00/00971

§ 371 (c)(1), (2), (4) Date: Aug. 22, 2001

(87) PCT Pub. No.: WO00/51138

PCT Pub. Date: Aug. 31, 2000

(30) Foreign Application Priority Data

Feb. 22, 1999 (JP) .......................................... 11-043005

(51) Int. Cl.[7] .................................................. B32B 5/16

(52) U.S. Cl. ....................... 428/403; 428/404; 428/407; 427/212; 427/261; 427/304; 427/305; 427/306

(58) Field of Search ................................ 428/403, 404, 428/407; 427/212, 261, 304, 305, 306

(56) References Cited

U.S. PATENT DOCUMENTS 4,546,037 A * 10/1985 King .......................... 428/323
4,548,862 A * 10/1985 Hartman ..................... 428/323
4,944,985 A * 7/1990 Alexander et al. .......... 428/570
5,134,039 A * 7/1992 Alexander et al. .......... 428/614
5,847,327 A * 12/1998 Fischer et al. .............. 174/258

FOREIGN PATENT DOCUMENTS

| | | |
|---|---|---|
| JP | 1-242782 | 9/1989 |
| JP | 4-36902 | 2/1992 |

* cited by examiner

*Primary Examiner*—Leszek Kiliman
(74) *Attorney, Agent, or Firm*—Westerman, Hattori, Daniels & Adrian, LLP

(57) ABSTRACT

A conductive electrolessly plated powder used, for example, for bonding a small electrode of an electronic device, its producing method, and a conductive material containing the plated powder. Conventionally, there has been known, as conductive powders, metallic powders such as of nickel, carbon powders, and conductive plating powders the resin core particles of which are coated with a metal, e.g., nickel. However, there has been no conductive electrolessly plated powders having a good conductivity with respect to connection between conductive patterns having an oxide coating thereon or between electrodes and no methods for producing such powders industrially. The conductive electrolessly plated powder of the present invention consists of resin spherical core particles the average size of which is 1 to 20 μm and each of which has a nickel or nickel alloy coating formed by electroless plating. The coating includes small projections of 0.05 to 4 μm on its outermost layer and the coating is substantially continuous with the small projections. A method of producing such a powder is also disclosed.

8 Claims, 3 Drawing Sheets

CONDUCTIVE ELECTROLESSLY PLATED POWDER, ITS PRODUCING METHOD, AND CONDUCTIVE MATERIAL CONTAINING THE PLATED POWDER

FIELD OF THE INVENTION

The present invention relates to a conductive electrolessly plated powder used, for example, for bonding small electrodes of electronic devices and the like, its producing method, and a conductive material containing the plated powder. Specifically, the present invention relates to a conductive electrolessly plated powder, its producing method, and a conductive material used for a conductive adhesive, an anisotropic conducting layer, and an anisotropic conductive adhesive or the like for conducting and bonding the confronting connecting circuits.

PRIOR ART

Heretofore, as a conductive powder used for a conductive adhesive, an anisotropic conducting layer, an anisotropic conductive adhesive or the like, metal powder such as nickel, copper, silver, gold, solder and the like; carbon series such as carbon powder, carbon fiber, carbon flake and the like; and conductive plated powder coated with metal such as nickel, nickel-gold, copper, gold, silver, solder and the like to the surface of a resin core particle with electroless plating, vacuum deposition and the like, are known.

The conductive powder using the metal powder mentioned above is large in specific gravity, as well as amorphous in shape, and wide in particle size distribution. Therefore, when such powder is used by being mixed with various matrix materials, the purpose of the product becomes limited because the sedimentation or dispersion of the powder is extremely difficult.

The conductive powder using the carbon series powder mentioned above is not used in a purpose requiring high conductive property or high reliability, because the conductivity of the carbon itself is small.

The conductive powder using the conductive plated powder mentioned above is generally produced with a method of dipping the core powder to a plating solution prepared in beforehand, performing plating reaction for a period of time determined by an empirical supposition, and stopping the reaction. The electrolessly plated powder having projections to the surface thereof is easily obtained with such method. However, when the core to be plated is a granule or a powder having large specific surface, autolysis of the plating solution occurs, so that the obtained electrolessly plated powder becomes mixed with fine nickel resolvents.

Also, because a strong aggregate is formed, the aggregate is cracked with physical technique or the like. This results in breaking of the aggregates and a phenomenon of exposing the uncovered surface.

An example of an electroless plating method for a powder or powdery core solving such problem includes a conductive filler consisting of an electrolessly plated powder with fine metal particles deposited and formed as thick and substantially continuous coating to the surface of an organic or a mineral base material using electroless plating method, which the applicant of the present invention had developed earlier (Japanese Patent Laid-Open No. H1-242782).

The electrolessly plated powder obtained by the above-mentioned method has the plated fine metal particles deposited and formed as a thick and substantially continuous coating to the core powder, with the shape of the coating excelling in flatness, without forming bumps. Therefore, it is possible to provide excellent high conductive property, when the powder is used for the conductive adhesive, the anisotropic conducting layer, and the anisotropic conductive adhesive or the like.

However, the electrolessly plated powder obtained in the method mentioned above has a flat surface. Therefore, for example, when the powder is used for a conductive adhesive and the like for adhering circuit boards formed with aluminum wiring patterns in a condition where the aluminum wiring patterns confront each other, there are cases where good conductivity cannot be obtained. This is because the surface of the aluminum wiring pattern is normally formed with 3–9 nm of oxide coating, so that the powder cannot break through the oxide coating, as well as the contact area becomes small.

Also, the Japanese Patent Laid-open No. H4-36902 discloses a method of producing conductive particulates by performing metal plating to the surface of non-conductive particulates that has projections at the surface thereof.

However, the conductive particulates mentioned above is characterized in its core, with the projections formed to the surface of the particulates (mother particles) indicating a flat surface by a method of adhering using an adhesive or welding directly the child particles of the same material or of a different material, or by a method of adhering the child particles to the surface of the mother particles by putting the mother particles in a rotating container and evaporating the solvent while rotating the container, and the like, and with the metal plating being provided to the surface of the particles thereafter. With such structure, the conductive particulates mentioned above suffers from defects such as the child particles easily detaching by ultrasonication used for dispersion and the like during plating pretreatment process and the like, resulting in occurrence of dispersion in the surface condition after plating. Therefore, the conductive particles mentioned above cannot obtain good conductivity constantly.

The present invention solves the problems mentioned above, with the aim of providing a conductive electrolessly plated powder having a good conductivity with respect to connection between conductive patterns or between electrodes having an oxide coating thereon, a method of producing such powders in a manner advantageous industrially, and a conductive material containing the electrolessly plated powder.

SUMMARY OF THE INVENTION

That is, the present invention provides a conductive electrolessly plated powder formed with nickel or nickel alloy coating with electroless plating to a surface of a spherical core particle having an average particle diameter of 1–20 $\mu$m, wherein said plated powder includes small projections of 0.05 to 0.4 $\mu$m on an outermost layer thereof, and said coating is substantially continuous with said small projections.

Moreover, the present invention provides a method of producing a conductive electrolessly plated powder, the method comprising:

- a catalyzing treatment process of carrying palladium to a surface of a spherical core particle by first capturing the palladium ion to the surface of the spherical core particle and reducing the same;
- an A process which is an electroless plating process of adding an aqueous slurry of the spherical core to an electroless plating bath including nickel salt, reducing agent, compelxing agent and the like; and a B process which is an electroless plating process of adding components of an electroless plating solution divided into at least two solutions, respectively, to an aqueous slurry of the spherical core simultaneously and sequentially; wherein at least both of said A process and B process are carried out after said catalyzing treatment process.

Further, the present invention provides a conductive material using the conductive electrolessly plated powder.

BRIEF DESCRIPTION OF THE DRAWINGS

Also.

DETAILED DESCRIPTION OF PREFERRED EMBODIMENTS

Figure 1:
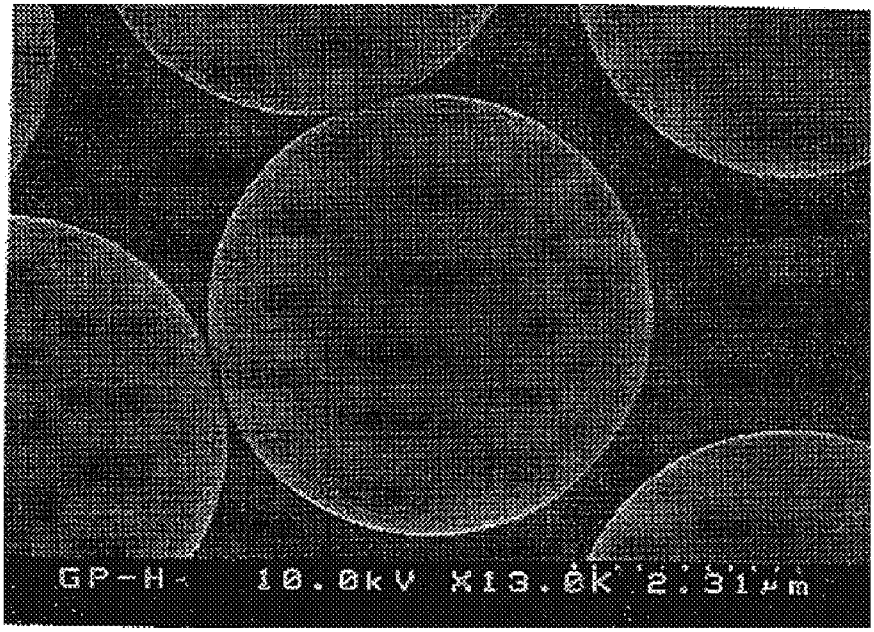
FIG. 1 is a SEM photograph (magnified 13,000 times) of spherical core particles used in Embodiment 1.

A conductive electrolessly plated powder the present invention is aiming to provide is an electrolessly plated powder with nickel or nickel alloy (hereinafter occasionally explained as nickel collectively) coating formed by electroless plating on a surface of a spherical core particle having the average particle diameter of 1 to 20 μm, preferably 3 to 10 μm, with the structural characteristic of including small projections of 0.05 to 4 μm to the outermost layer of the nickel coating, and the nickel coating is substantially continuous with the small projections.

The plated powder is formed with nickel or nickel alloy coating to the particle surface with electroless nickel plating. An example of the nickel alloy includes nickel-phosphorous alloy, nickel-boron alloy, and the like.

The surface of the plated powder includes small projections of 0.05 to 4 μm, and the size of the small projection is preferably 20% or less of the average particle diameter of the electrolessly plated powder. For example, when the average particle diameter is 5 μm, the small projection is 1 μm or less, and when the average particle diameter is 10 μm, the small projection is 2 μm or less. The reason for limiting the small projection to 20% or less of the average particle diameter is that the small projection exceeding 20% is substantially difficult to produce.

The size of the small projection is in relation with the coat thickness mentioned afterwards, and the maximum size is limited to around 10 times the coat thickness. For example, when the coat thickness is 0.2 μm, the size of the formed small projection is 2 μm or less. The coat thickness is confirmed with a chemical analysis, and the size of the small projection is confirmed with an electron microscope photograph.

The material of the small projection is not particularly limited. However, it is preferably nickel or nickel alloy.

A plurality of the small projections must be present on the surface of one electrolessly plated powder particle, and at least one or more of the small projections must be present inside the area of $(D/2)^2$ μm$^2$ (D represents an average diameter of the electrolessly plated powder particle). The proportion of the existence of the small projections is also confirmed with an electron microscope photograph.

The shape of the small projection is not limited, and could be any of semicircular, conical, pyramidal, or the like.

The conductive electrolessly plated powder according to the present invention includes projections as is mentioned above, the structure of which is comprised of the small projections of nickel and nickel coating formed simultaneously to the spherical core particle with electroless nickel plating. Its structure is constructed from the small particles and the nickel plating, which includes, for example, (a) the case of forming the cores of the small particles and the nickel plating on the spherical core particle and then forming uniform and continuous nickel coating to the surface thereof, (b) the case of forming nickel coating to the spherical core particle and then forming the cores of the small particles and the nickel plating simultaneously to the surface thereof, or(c) the case of forming the nickel coating on (b), and further (d) the case of forming gold plating to the surface of (a) through (c), and the like.

The small projections grow with the growth of the nickel coating in each of the above-mentioned conductive electrolessly plated powder, so that the small projections are continuously coated with the nickel coating, resulting in the structural characteristic of the small projections not being detached by the ultrasonic wave or the like and excelling in adhering property.

The nickel coating and the small projections forming such continuous coating is confirmed by the cut surface of the particle.

The material of the spherical core particle is not particularly limited as long as the powder is insoluble to water. However, when seen from its property, it is selected from a mineral or an organic powder indicating spherical appearance, and should be able to be electrolessly plated. An example of a mineral spherical core powder includes metal powder, oxide of metal or nonmetal (including inclusions thereof), metal silicate including aluminosilicate, metal carbide, metal nitride, metal carboxylate, metal sulfate, metal phosphate, metal sulfide, metal oxide salt, metal halide, or carbon, glass powder and the like.

An example of an organic spherical core powder includes polyolefin such as polyethylene (PE), polyvinyl chloride (PVC), polyvinylidene chloride, polytetrafluoroethylene (PTFE), polypropylene (PP), polystyrene (PS), polyisobutylene (PIB), polyvinylpyridine, polybutadiene (BR), polyisoprene, and polychloroprene and the like, olefin copolymer such as styrene-acrylonitrile copolymer (SAN), acrylonitrile-butadiene-styrene copolymer (ABS), ethylene-methacrylic acid copolymer (ionomer), styrene-butadiene rubber (SBR), nitrile rubber (NBR), ethylene propylene elastomer, butyl rubber, and thermoplastic olefin elastomer and the like, derivatives of acrylic acid such as polyacrylate, polymethyl methacrylate (PMMA), and polyacrylamide and the like, polyvinyl compound such as polyvinyl acetate (PVA), polyvinyl alcohol (PVAL), polyvinyl butyral (PVB), polyvinylformal (PVF), polyvinyl ether, polyvinyl pyrrolidone, and polyvinyl carbazole and the like, polyurethane such as flexible polyurethane foam, rigid polyurethane foam, and polyurethane elastomer and the like, ether polymer such as polyacetals, polyethylene glycol (PEG), polypropylene glycol (PPG), epoxy resin, and polyphenylene oxide (PPO) and the like, polyester such as polyethylene terephthalate (PET), polybutylene terephthalate (PBT), polydihydroxy methylcyclohexyl terephthalate, cellulose ester, unsaturated polyester, aromatic polyester, and polycarbonate and the like, polyamide such as aliphatic polyamide and the like, amino series resin made from amino compound such as phenolic resin, phenol-formaldehyde resin (PF), urea-formaldehyde resin (UF), melamine-formaldehyde resin (MP), polyphenylene sulfide (PPS), polybenzimidazole (PBI), benzoguanamine, urea, thiourea, melamine, acetoguanamine, dicyanamide, and aniline and the like, and from aldehydes such as formaldehyde, paraformaldehyde, acetaldehyde and glyoxal and the like, fluorine-containing resin, nitrile series resin and the like. Among these examples, an organic resin powder is preferably used.

Such core particle is substantially spherical. By saying that it is a substantially spherical particle, it means that it can include the shape close to sphere such as an ellipse, other than a complete sphere. However, the shape closer to the sphere is preferred.

As the particle property of the spherical core particle, the spherical core particle with the average particle diameter in the range of 1–20 $\mu$m, preferably in the range of 3–10 $\mu$m, and more preferably with the CV value of 10% or less is selectively used. The CV value means a coefficient of variation indicated by CV value %=(standard deviation)/(mean value)*100.

The electroless plated layer formed on the surface of the spherical core particle equipped with the above-mentioned particle property is a plate coating of a nickel or a nickel alloy, and it can also be a bilayer coating of two kinds or more. In the case of the bilayer coating, a nickel-gold bilayer coating is preferred. An example of the nickel alloy includes nickel-phosphorous, nickel-boron and the like. The rate of content of phosphorous and boron within the coating is not particularly limited, but it is preferably 5 weight % or less, and 3 weight % or less, respectively. The reason for limiting to nickel or nickel alloy coating is that it could form an electroless coating layer adhering strongly with the spherical core particle and having good anti-exfoliation property, as well as it could function effectively as an intermediate layer securing tight bonding with an upper plate coating layer, when forming bilayer with gold. Also, when forming nickel-gold bilayer coating, the conductive property can be enhanced further compared to the single layer coating.

The formed electroless nickel plate coat thickness is in the range of 0.05–0.5 $\mu$m. When the thickness is less than 0.05 $\mu$m, it lacks uniformity of the coating layer, and also is inferior in conductive property. When it exceeds 0.5 $\mu$m, the particles aggregate together in the plating process to cause a bridge phenomenon, so that dispersiveness becomes lost.

The nickel coat thickness mentioned here means the thickness including the nickel coating and the small projections, and is an average coat thickness calculated from chemical analysis.

The method of producing the conductive electrolessly plated powder according to the present invention is characterized in combining a catalyzing treatment process which captures palladium ion to the surface of the spherical core particles and then carrying palladium to the surface of the core by reducing the same, with the electroless plating of an A process mentioned below and a B process mentioned below performed after the catalyzing treatment.

The A process is an electroless plating process of adding an aqueous slurry of the spherical core to an electroless plating bath including nickel salt, reducing agent, complexing agent and the like. In such A process, autolysis of the plating bath starts simultaneously with the formation of the nickel coating on the spherical core particles. The autolysis occurs at the vicinity of the spherical core particles, so that the cores of the small projections are generated by the autolysates being captured on the surface of the core particles during formation of the nickel coating, and the nickel coating is formed simultaneously.

The B process is an electroless plating process of separating the components of the electroless plating solution to at least two solutions, and adding the two solutions simultaneously and sequentially (for example, continuously) to the aqueous slurry of the spherical core. In such B process, the growth of the small projections and the growth of the nickel coating are carried out simultaneously when the core for the small projections exist on the spherical core particles, and the formation of the nickel coating is performed uniformly and continuously on the spherical core particles when the small projections does not exist.

The combination of the A process mentioned above and the B process mentioned above includes (1) method of performing A process first, and then performing B process, (2) method of performing B process first, and then performing A process, and (3) method of performing B process first, and then performing A process, and further performing B process, and the like. This combination is not particularly limited.

In the method of the present invention, the combination (1), which first generates the formation of the cores of the small projections and the formation of the nickel coating simultaneously on the spherical core particles, and then forming the nickel coating uniformly and continuously to the surface thereof, is preferred.

Moreover, in forming the nickel-gold bilayer coating in the present invention, it is manufactured by performing an electroless plating C process of providing gold plating treatment on the spherical core formed with nickel coating from the combination of the A process and the B process mentioned above.

The specific means of the electroless plating, for example the combination (1) will be explained. Because the electroless plating is carried in water series, the spherical core particles must be treated with hydrophilization with acid, alkaline or the like, when it is not hydrophilic. The selection of acid or alkaline is properly selected based on the characteristics of the spherical core particles. Next, a reforming treatment of adding catalyst capturing ability to the surface of the spherical core particles is carried out. The catalyst capturing ability is a function enabling capturing of palladium ion as chelate or salt to the surface of the spherical core particles during catalyzing treatment process. In general, the capturing ability exists in spherical core particles including one or two or more of the group consisting of amino group, imino group, amide group, imide group, cyano group, hydroxyl, nitrile group, or carboxyl group to the surface thereof. Therefore, the spherical core substances including catalyst capturing ability includes organic substances such as amino series resin, nitrile series resin, or epoxy series resin hardened with amino hardener, and the like. These spherical core powders are preferably used for the object of the present invention.

When the spherical core itself have no catalyst capturing ability, the capturing ability must be provided with a surface treatment. This reformation can be carried out with the method disclosed in Japanese Patent Laid-Open Sho61-64882, that is, using an epoxy series resin hardening with an amine series hardener or an organosilane series coupling agent with substituted amino group.

The catalyzing treatment process is a process of dispersing the spherical core powder sufficiently inside a thin acidic aqueous solution of palladium chloride in order for the surface thereof to capture the palladium ion. The concentration of the palladium chloride aqueous solution is sufficient in the range of 0.05–1 g/L. Then, after performing a repulping wash, the palladium is captured to the surface of the spherical core particles by reducing the palladium ion captured to the surface of the spherical core particles. This reducing treatment is carried out by adding a reducing agent aqueous solution to the spherical core powder slurried and sufficiently dispersed beforehand. The reducing agent used herein includes sodium hypophosphite, sodium borohydride, potassium borohydride, dimethylamine borane, hydrazine, formalin and the like. The amount of the reducing agent to be added differs with the specific surface of the spherical core, but the range of 0.01–10 g/L against the slurry is appropriate.

In the electroless plating A process, the aqueous slurry is prepared by dispersing the spherical core particles performed with catalyzing treatment sufficiently in water, in the range of 1–500 g/L, preferably in the range of 5–300 g/L. The dispersing operation can be an ordinary stirring, high-speed stirring, or can be performed using a searing dispersing device such as a colloid mill or a homogenizer. Also, ultrasonic wave can be combined with the dispersing operation mentioned above. During the dispersing operation, there are cases where a dispersing agent such as a surface active agent or the like is added according to need. Next, the spherical core slurry performed with dispersing operation is added to the electroless plating bath including nickel salt, reducing agent, complexing agent, and various additives or the like, to perform the electroless plating A process. In the electroless plating A process, the nickel particulates acting as the cores for the small projections are formed on the spherical core particles simultaneously with the formation of the nickel coating.

As the nickel salt, nickel chloride, nickel sulfate, nickel acetate and the like are used, with the concentration in the range of 0.1–50 g/L. As the reducing agent, sodium hypophosphite, dimethylamine borane, sodium borohydride, potassium borohydride, and hydrazine and the like are used, with the concentration in the range of 0.1–50 g/L. As the complexing agent, compound having completing effect against nickel ion, including carboxylic acid (salt) such as citric acid, hydroxyacetic acid, tartaric acid, malic acid, lactic acid, and gluconic acid, or their alkali metal salt or ammonium salt and the like, amino acid such as glycine or the like, amine acid such as ethylenediamine, alkylamine and the like, or other ammonium, EDTA, pyrophosphoric acid (salt) and the like, are used. These may be used alone or in combination of two or more. Its concentration is in the range of 1–100 g/L, preferably in the range of 5–50 g/L. The pH of the electroless plating bath at this point is in the range of 4–14.

The electroless plate reaction starts as soon as the spherical core slurry is added, accompanied by generation of hydrogen gas. The electroless plating A process is finished at the time when the generation of the hydrogen gas is completely finished.

Next, in B process, the electroless plating is performed by fractionating and adding in a predetermined amount ratio the predetermined amount of each of the aqueous solutions of nickel salt, sodium hypophosphite, and sodium hydroxide constituting the electroless plating solution separated to at least two solutions, simultaneously and sequentially, preferably continuously, subsequent to the A process mentioned above.

By adding the electroless plating solution, the plating reaction starts again. However, by adjusting the amount added thereto, the nickel coating formed can be controlled to a desired coat thickness. After completing addition of the electroless plating solution, the reaction is concluded by continuing stirring while maintaining the solution temperature for some time, after the generation of the hydrogen gas is stopped completely.

The electroless plating B process mentioned above is carried out continuously after the electroless plating A process. However, it may be carried out by performing the electroless plating B process by fractionating the spherical core particles and the plating solution with a method such as filtration or the like after completion of the electroless plating A process, preparing the aqueous slurry by newly dispersing the spherical core particles to water, adding the aqueous solution made by dissolving the complexing agent in the concentration range of 1–100 g/L, preferably 5–50 g/L, and preparing the aqueous slurry.

With the above-mentioned process, the forming of the nickel coating and the forming of the small projections are carried out on the spherical core particles. Moreover, by performing other metal plating process (C process) to the surface thereof, a bilayer coating excelling further in conductive property can be formed. For example, in forming the gold coating, the process is carried out by heating an electroless plating bath of the complexing agent such as EDTA-4Na, citric acid-2Na and the like and potassium gold cyanide, with the pH adjusted to a slightly acidic region with sodium hydroxide aqueous solution, adding the above-mentioned nickel plate powder while stirring to obtain a dispersed suspension, and performing operation of a plating reaction by adding independently the mixed aqueous solution of potassium gold cyanide, EDTA-4Na and citric acid-2Na, and the mixed aqueous solution of potassium borohydride and sodium hydroxide. Thereafter, the result is collected as a product by performing the after treatment under the ordinary way.

Also, the method of (2) and (3) may be carried out by combining the A process and the B process, as is in the method (1) mentioned above.

Moreover, by mixing the obtained conductive electrolessly plated powder to a binder with the main component of insulating resin such as thermosetting, thermoplastic and the like, to obtain paste-like or sheet-like form, a conductive material using the conductive electrolessly plated powder as a conductive filler can be obtained. For example, the same can be used as a conductive adhesive, an anisotropic conductive film, and anisotropic conductive adhesive or the like, for conducting and adhering the opposing connecting circuits.

The insulating resin used in the present invention includes one or more selected from the group consisting of epoxy series resin, polyester series resin, phenolic resin, xylene resin, amino resin, alkyd resin, polyurethane resin, acryl series resin, polyimide resin, styrene series resin, vinyl chloride resin, silicone resin and the like. Also, a crosslinking agent, a tackifier, a degradation preventing agent, and various coupling agents and the like can be combined, according to need.

INDUSTRIAL APPLICABILITY

The conductive material according to the present invention can be produced by mixing each of the above-mentioned ingredients. The shape of such conductive material can take various configurations such as paste-like, sheet-like and the like. The paste-like configuration can be produced by containing an appropriate solvent in the insulating resin. Also, the sheet-like configuration can be produced by coating the material on a polyester series film performed with release process with a bar coater and the like, and drying the same.

Such conductive material, in the case of the paste-like configuration, is used as a connecting material by coating the material on electrodes of circuit boards using a screen printer and the like, forming a coating of 5–100 μm by drying the solvent inside the insulating resin, aligning the electrodes of confronting circuit boards, and conducting and connecting the electrodes by pressing and heating the same. In the case of the sheet-like configuration, the material is used as a connecting material by adhering the material on top of the electrodes of the circuit boards, false compressing the same, aligning the electrodes of the object connecting circuit boards, and conducting and connecting the electrodes by pressing and heating the same.

The conductive material obtained from above is used for connecting the electrodes of a liquid crystal display and the driving LSI, and connecting the LSI chip to a circuit board and the like. Specifically, it is preferably used in connecting together the conductor circuits having an oxide film on the surfaces of the electrodes to be connected.

The present invention will be explained in detail below, indicating the examples and the comparative examples. However, the present invention is not limited to the examples mentioned below.

EXAMPLE 1 through 5

A benzoguanamine-melamine-formaline resin with the average particle diameter of 4.6 μm, absolute specific gravity of 1.4 (Product of Nippon Shokubai Co., Ltd. under the name of "EPOSTAR") is used as the spherical core, and 20 g of the material is injected to 400 mL of 0.1 g/L palladium chloride aqueous solution while stirring the same. The palladium ion is captured to the spherical core by performing stir treatment for 5 minutes. After filtering the aqueous solution, the spherical core powder once performed with repulping wash is injected to 400 mL of 1 g/L sodium hypophosphite aqueous solution under room temperature while stirring the same to perform reducing treatment for one minute, and palladium is carried to the surface of the spherical core powder. Next, the spherical core is injected to nickel sulfate aqueous solution and sodium hypophosphite aqueous solution heated to 60 degrees Celcius with the concentration shown in Table 1, and 1 L of 20 g/L sodium tartrate aqueous solution heated to 60 degrees Celcius, to start the electroless plating A process. The solution is stirred for 20 minutes, and stopping of foaming of hydrogen is confirmed.

Next, 300 mL each of 224 g/L nickel sulfate aqueous solution and a mixed aqueous solution of 210 g/L of sodium hypophosphite and 80 g/L of sodium hydroxide is fractionally added through a metering pump at an addition speed of 3 mL/min to start the electroless plating B process. After adding the whole volume of the plating solution, stirring is continued while maintaining the temperature of 60 degrees Celcius, until foaming of hydrogen is stopped. Next, the plating solution is filtered, and the filtered substance performed with repulping wash three times is dried in a vacuum dryer of 100 degrees Celcius to obtain a powder having nickel-phosphorus alloy plate coating. The filtrates after plating reaction are all water-clear, so that it is confirmed that the plating solutions provided are completely consumed by the plating reaction. By observing the obtained nickel electrolessly plated particle with an electron microscope, it is confirmed that each of the particles are spherical particles formed with coatings with small projections, and that the plated coatings are formed as thick and substantially continuous coatings, as is apparent from attached FIG. 1 through FIG. 3.

Figure 2:
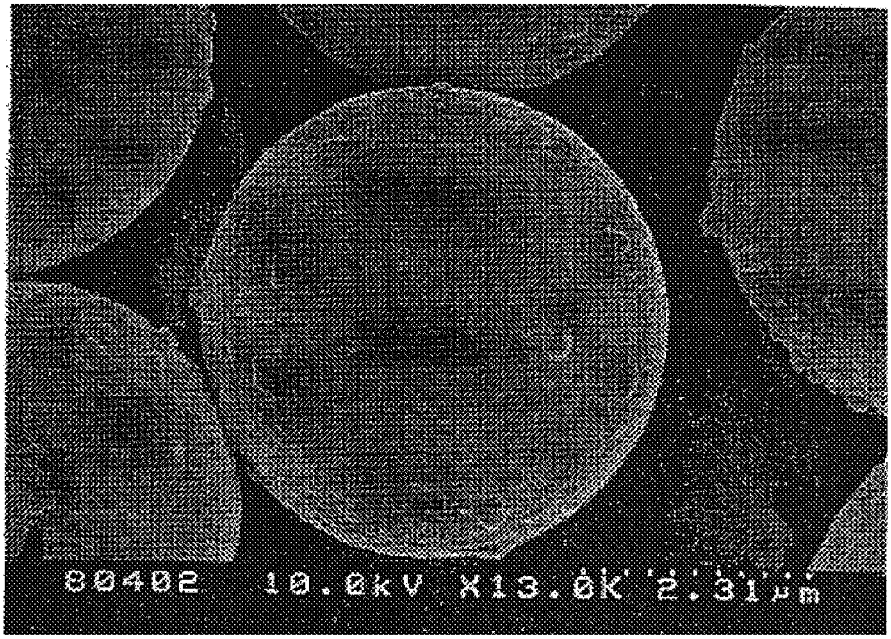
FIG. 2 is a SEM photograph (magnified 13,000 times) of conductive electrolessly nickel plated powders obtained in Embodiment 1.
Figure 3:
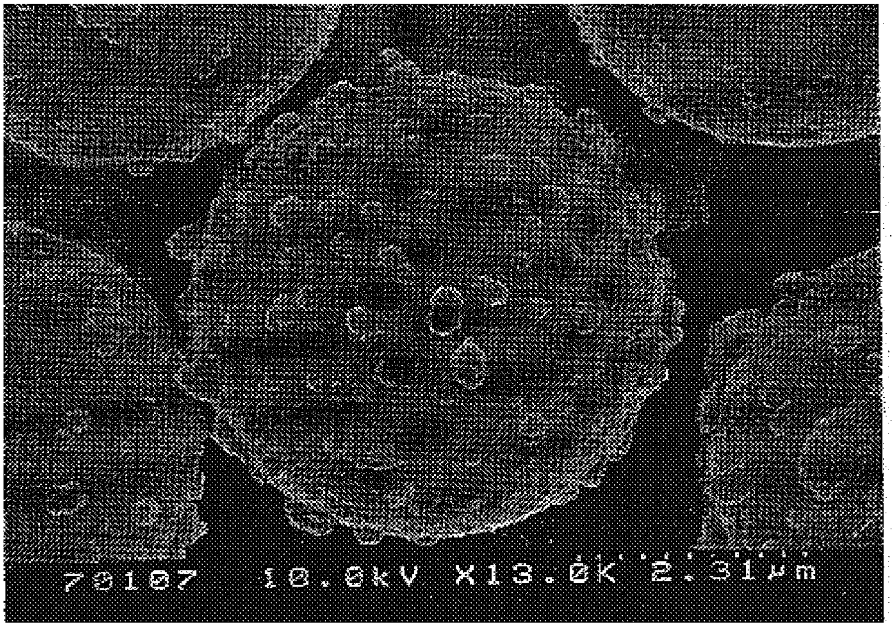
FIG. 3 is a SEM photograph (magnified 13,000 times) of conductive electrolessly nickel plated powders obtained in Embodiment 2.

FIG. 1 is an electron microscope (SEM) photograph of the resin particle used as the core, and FIG. 2 and FIG. 3 are SEM photograph of the conductive electrolessly plated powder formed with nickel coating from Examples 1 and 2. As for the condition of the powder, it is admitted from these figures that the surface of the spherical core is completely covered by the plated layer, with the small projections presented thereon.

EXAMPLE 6

10 g of the electrolessly nickel plated particle obtained in Example 1 is added while stirring to 750 mL of an electroless plating solution composed of EDTA-4Na (10 g/L), citric acid-2Na (10 g/L), and potassium gold cyanide (3.2 g/L, and 2.2 g/L as Au), adjusted to pH 6 with sodium hydroxide aqueous solution, with the solution temperature of 60 degrees Celcius, to perform plating treatment for 10 minutes. Next, 120 mL of a mixed aqueous solution of potassium gold cyanide (20 g/L, and 13.7 g/L as Au), EDTA-4Na (10 g/L), and citric acid-2Na (10 g/L), and 120 mL of a mixed aqueous solution of potassium borohydrate (30 g/L), and sodium hydroxide (60 g/L), are added in a period of 20 minutes individually via a liquid pump.

Figure 4:
FIG. 4 is a SEM photograph (magnified 13,000 times) of conductive electrolessly nickel-gold plated powders obtained in Embodiment 6.

After filtering the liquid, the filtered substance is performed with repulping wash for three times, dried in a vacuum dryer under 100 degrees Celcius, to obtain gold plate covering treatment (C process) on the nickel plate coating of the spherical core particles. By observing the obtained double-layer electrolessly plated particles with the electron microscope, it is confirmed that the small projections formed during nickel plating did not exfoliate, and that the gold coating is formed as thick and substantially continuous coating on top of the nickel plate coating. The electron microscopic photograph of the obtained conductive electrolessly plated powder is shown in FIG. 4.

COMPARATIVE EXAMPLE 1

With the method identical to Example 1, palladium ion captured to the surface of the spherical core resin particle is reduced, and then the particle is filtered to obtain the powder performed with catalytic activity. Next, 2 L of a plating solution of pH 5 comprised of 30 g/L of nickel sulfate, 25 g/L of sodium hypophosphite, 50 g/L of sodium malic acid, 15 g/L of sodium acetate, and 0.001 g/L of lead acetate, is vatted and heated to 75 degrees Celcius, and the above-mentioned powder performed with catalytic activity is injected, stirred and dispersed therein. By using an automatic adjustment to add 200 g/L of sodium hydroxide, the pH of the solution during reaction is adjusted and held to the pH at the beginning of reaction. Also, when the reaction stops, the reaction is continued by adding 200 g/L of sodium hypophosphite aqueous solution in small amounts. When the solution stops foaming even when the sodium hypophosphite aqueous solution is added, the entire addition is stopped. Then, the solution is filtered, and the filtered substance is performed with repulping wash for three times, is dried in a vacuum drier under 100 degrees Celcius, to obtain a powder having nickel-phosphorus alloy plate coating. The electron microscopic photograph of the obtained nickel electrolessly plated powder is shown in FIG. 5.

Figure 5:
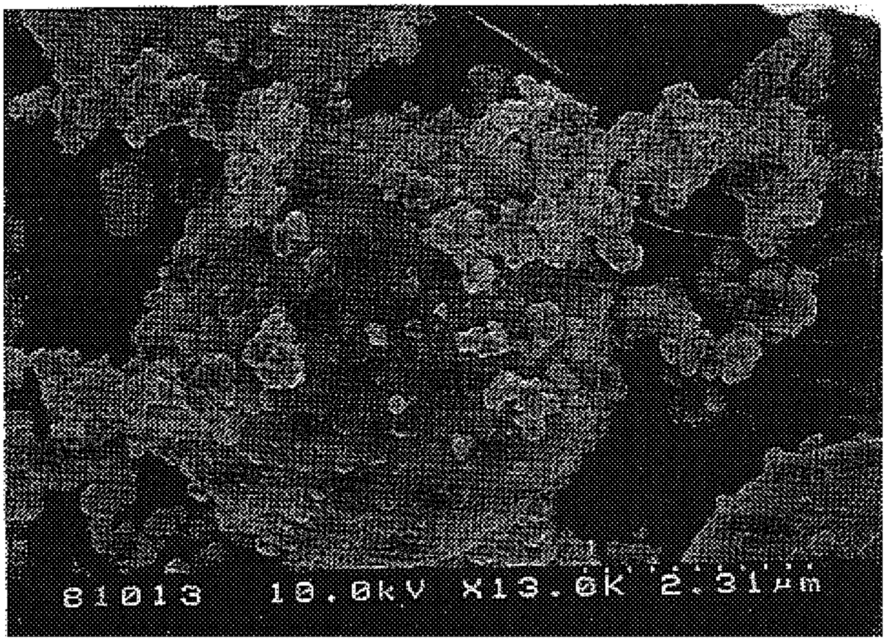
FIG. 5 is a SEM photograph (magnified 13,000 times) of conductive electrolessly nickel plated powders obtained in Comparative example 1.

As is apparent from FIG. 5, the product of this Comparative example utilized the method of the electroless plating vat method conventionally used, so that microscopic nickel resolvent is mixed therein. Therefore, it is inferior in adherence of the projections or conductivity, and cannot be put to practical use.

COMPARATIVE EXAMPLE 2

With the method identical to Example 1, palladium ion captured to the surface of the spherical core resin particle is reduced, and then the particle is filtered to obtain the powder performed with catalytic activity. Next, 2 L of a plating solution of pH 5 comprised of 2.1 g/L of nickel sulfate, 25 g/L of sodium hypophosphite, 50 g/L of sodium malic acid, 15 g/L of sodium acetate, and 0.001 g/L of lead acetate, is vatted and heated to 75 degrees Celcius, and the above-mentioned powder performed with catalytic activity is injected, stirred and dispersed therein. By using an automatic adjustment to add 200 g/L of sodium hydroxide, the pH of the solution during reaction is adjusted and held to the pH at the beginning of reaction. Also, when the reaction stops, the reaction is continued by adding 200 g/L of sodium hypophosphite aqueous solution in small amounts. When the solution stops reacting even when the sodium hypophosphite aqueous solution is added, the entire addition is stopped. Then, the solution is filtered, and the filtered substance is performed with repulping wash for three times, is dried in a vacuum drier under 100 degrees Celcius, to obtain a powder having nickel-phosphorus alloy plate coating.

The product of Comparative example 2 is a plated particle obtained from a plating bath with low nickel concentration, so that it is thin in plate coat thickness, and is inferior in conductivity. Therefore, it cannot be put to practical use.

COMPARATIVE EXAMPLE 3

With the method identical to Example 1, palladium ion captured to the surface of the spherical core resin particle is reduced, and then the particle is filtered to obtain the powder performed with catalytic activity. Next, the above-mentioned powder performed with catalytic activity is injected and stirred in 2 L of 20 g/L sodium tartrate aqueous solution heated to 65 degrees Celcius, and is stirred and dispersed sufficiently to prepare an aqueous slurry. Then, 320 mL of 0.85 mol/L nickel sulfate aqueous solution, and 320 mL of a mixed aqueous solution of 2.0 mol/L sodium hypophosphite and 2.0 mol/L sodium hydroxide are respectively added fractionally through a metering pump at the addition speed of 5 mL/min. After adding the entire amount, stirring is continued while maintaining the temperature of 65 degrees Celcius until forming of hydrogen is stopped. Then, the plating solution is filtered, the filtered substance is performed with repulping wash for three times, is dried in a vacuum drier under the temperature of 100 degrees Celcius, to obtain the powder having nickel-phosphorus alloy plate coating. The electron microscopic photograph of the obtained nickel electrolessly plated powder is shown in FIG. 6.

Figure 6:
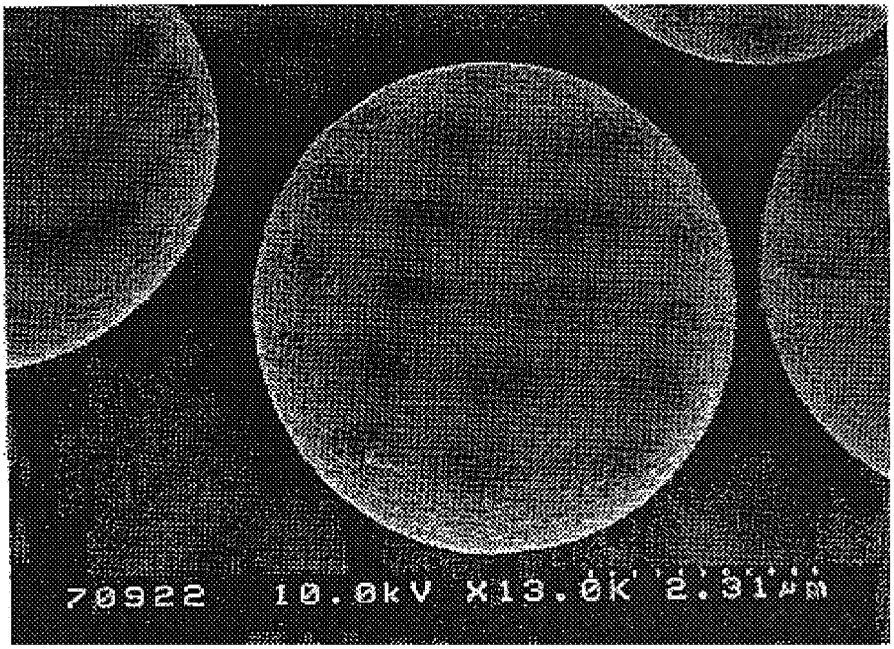
FIG. 6 is a SEM photograph (magnified 13,000 times) of conductive electrolessly nickel plated powders obtained in Comparative example 3.

As is apparent from FIG. 6, the product of Comparative example 3 is produced with the method of electroless plating by continuous dropping for obtaining coating which excels in smoothness. Therefore the powder lacks small projections, so that it is inferior in conductivity, and cannot be put to practical use.

Evaluation of Physical Properties

Each of the average particle diameter, the plate coat thickness, the adherence property, the size and the distribution density of the projections, and the conductivity of the conductive electrolessly plated powder obtained in each of the Examples and Comparative examples mentioned above are evaluated, and the results are shown in Table 2. The evaluation of each of the physical properties is carried out with the method mentioned below.

Measurement of the average particle diameter of the plated powder: Measured using Coulter counter method.

Calculation of the plate coat thickness: The plate coat thickness is calculated by dissolving the plate coating by dipping the electrolessly plated powder in nitric acid, determining the coating component by ICP or by chemical analysis, and using the formula mentioned below.

Formula 1

$$A=[(r+t)^3-r^3]d_1/rd_2$$

$$A=W/100-W$$

Wherein r represents the radius of the core particle (μm), t represents the plate coat thickness (μm), $d_1$ represents the specific gravity of the plate coating, $d_2$ represents the specific gravity of the core particle, and W represents the metal content (weight %).

Measurement of the adherence property of the projections: 10 g of the coated powder is put in a 100 mL beaker, is added with 50 mL of demineralized water, and is treated in an ultrasonic wave washing machine (product of Honda Electronics Co., Ltd., 28 KHz, 100 W) for 10 minutes while stirring with a microspatula. The treated slurry is added with demineralized water to become 100 mL in volume, and is rested for 10 minutes. Then, 20 mL of the supernatant liquor is removed to a 100 mL beaker with a whole pipette, is added with 20 mL of nitric acid, is stirred for five minutes using a stirring rod, and the liquor is moved to a 100 mL measuring flask. Then, the nickel amount of the solution increased to 100 mL is measured by ICP, and the result is converted to nickel amount (g) per 1 g of the sample.

Measurement of the size and the distribution density of the projections:

The size of the projections: By observing the electron microscopic photograph of the plated powder, the projections appearing on each one of the plated particle is separately measured, and the average of the result is taken.

The distribution density: The average of the number of all of the projections existing on each of the plated particles, inside the field in the electron microscopic photograph enabling confirmation of the projections, is used.

Measurement of conductivity: 100 parts by weight of epoxy resin, 150 parts by weight of a hardener, and 70 parts by weight of toluene are mixed to prepare an insulating adhesive. Then, 15 parts by weight of the plated powder is combined, and the mixture is applied on a siliconized polyester film with a bar coater, and is dried. A glass totally vapor deposited with aluminum and a polyimide film substrate formed with copper pattern in 100 μm pitches is connected using the obtained film. The conductivity is measured by measuring the conduction resistance between the electrodes. The ohmic value of 2 Ù or less is evaluated as OK, and the ohmic value of 5 Ù or more is evaluated as NO.

As is indicated in Table 2, the conductivity of the products of the Examples satisfying the conditions of the present invention is superior to those of the Comparative examples.

EFFECT OF THE INVENTION

The conductive electrolessly plated powder according to the present invention includes small projections to the outermost layer of the nickel coating, with such small projections and coating formed as a continuous coating, so that phenomenon such as the exfoliation of the small projections or the coating will not occur even when the powder is mixed with matrix such as synthetic resin or synthetic rubber or the like. Moreover, when the powder is used in a conductive adhesive or the like for adhering the circuit boards formed with wiring patterns having oxide film in a condition where the wiring patterns confront each other, it can provide especially good conductivity, so that it can be applied as a conductive filler. Further, when a gold plated coating is formed on the nickel coating to obtain a double layer, the property as a conductive material is improved further.

Also, with the method of producing according to the present invention, the above-mentioned conductive electrolessly plated powder and the conductive material can be produced effectively, by performing the catalyzing treatment process of reducing and carrying palladium to the surface of the spherical core particles, and after the catalyzing treatment, performing at least the A process: electroless plating process of adding the aqueous slurry of the spherical core to the electroless plating bath including nickel salt, reducing agent, complexing agent and the like, and the B process: electroless plating process of adding respectively the components constituting the electroless plating solution separated to at least two solutions to the aqueous slurry of the spherical core simultaneously and sequentially, in a suitable combination.

TABLE 1

| Example No. | $NiSo_4$ (g/L) | $NaH_2PO_2$ (g/L) |
|---|---|---|
| Example 1 | 2.1 | 2.3 |
| Example 2 | 4.5 | 5.4 |
| Example 3 | 5.8 | 15.9 |
| Example 4 | 7.4 | 9.0 |
| Example 5 | 8.9 | 18.3 |

TABLE 2

| No. | Average Particle diameter (μm) | Coat thickness (nm) Nickel | Gold | Adherence | Projections Size (μm) | Distribution (number) | Conductive property |
|---|---|---|---|---|---|---|---|
| Example | | | | | | | |
| 1 | 4.8 | 94 | | ND* | 0.33 | 20 | OK |
| 2 | 4.8 | 96 | | ND | 0.40 | 72 | OK |
| 3 | 4.8 | 93 | | ND | 0.46 | 92 | OK |
| 4 | 4.9 | 95 | | ND | 0.51 | 84 | OK |
| 5 | 5.1 | 96 | | ND | 0.63 | 100 | OK |
| 6 | 5.0 | 81 | 29 | ND | 0.38 | 20 | OK |
| Comparative Example | | | | | | | |
| 1 | 7.8 | 72 | | 0.15 | 0.50 | 60 | NO |
| 2 | 4.7 | 3 | | ND | — | — | NO |
| 3 | 4.8 | 95 | | ND | — | — | NO |

*ND: 0.001 g/g or less

We claim:

1. A conductive electrolessly plated powder comprising a spherical core particle having an average particle diameter of 1–20 μm, wherein said particles include an electrolessly plated coating of a nickel or nickel alloy on surfaces thereof, and further wherein:

said plated powder includes small projections of 0.05 to 4 μm on the exterior of said coating;

said small projections are distributed over said coating; and an amount of nickel eluting from said plated powder is 0.001 g/g or less for 1 g of said plated powder, when 10 g of said plated powder is added with 50 mL of demineralized water and is subject to ultrasonic waves for 10 minutes at a resonance frequency of 28 KHz and ultrasonic output of 100 W.

2. A conductive electrolessly plated powder according to claim 1, wherein at least one or more of said small projections exists on the surface of one electrolessly plated powder particle inside an area of $(D/2)^2$ $\mu m^2$ (D represents an average diameter of said electrolessly plated powder particle).

3. A conductive electrolessly plated powder according to claim 1, further comprising a gold plate coating formed on top of said conductive electrolessly plated powder.

4. A conductive electrolessly plated powder according to claim 1, wherein said spherical core particle is a resin particle.

5. A method of producing a conductive electrolessly plated powder, the method comprising:

a catalyzing treatment process of carrying palladium to a surface of a spherical core particle by first capturing palladium ion to the surface of said spherical core particle and reducing the same;

an A process which is an electroless plating process of adding an aqueous slurry of said spherical core to an electroless plating bath including nickel salt, reducing agent, completing agent and the like; and a B process which is an electroless plating process of adding components of an electroless plating solution divided into at least two solutions respectively to an aqueous slurry of said spherical core simultaneously and sequentially;

wherein at least both of said A process and B process are carried out after said catalyzing treatment process.

6. A method of producing a conductive electrolessly plated powder according to claim 5, wherein said A process is carried out before said B process.

7. A method of producing a conductive electrolessly plated powder according to claim 5 or 6, wherein a C method of providing gold plating process is further added thereto.

8. A conductive material comprising a conductive electrolessly plated powder according to any one of claims 1 through 4.

* * * * *